April 22, 1969      J. F. COLLINS      3,439,921
PHONOGRAPH PICKUP
Filed Aug. 25, 1965
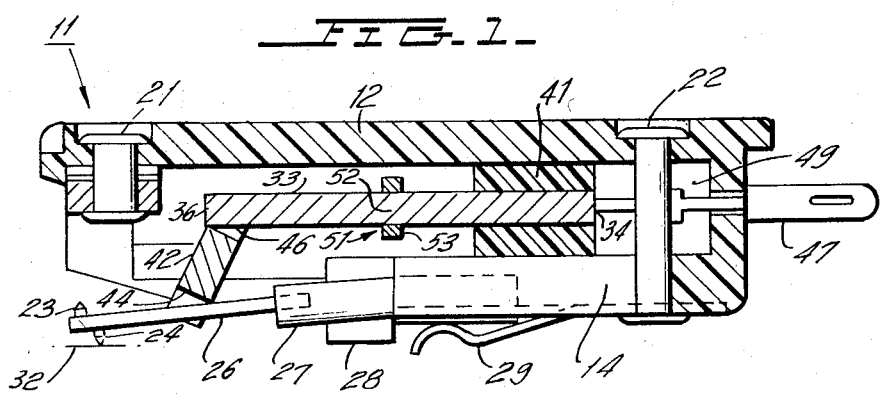
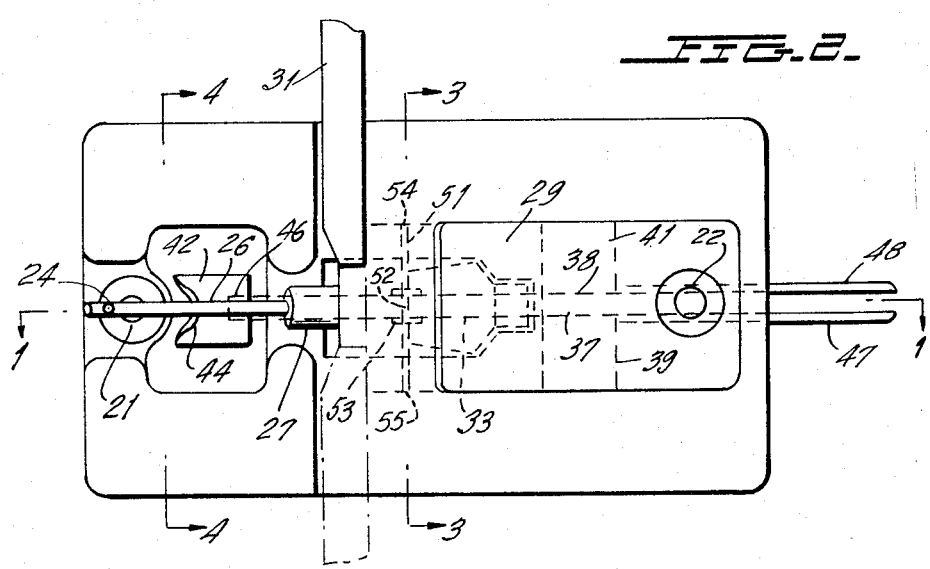
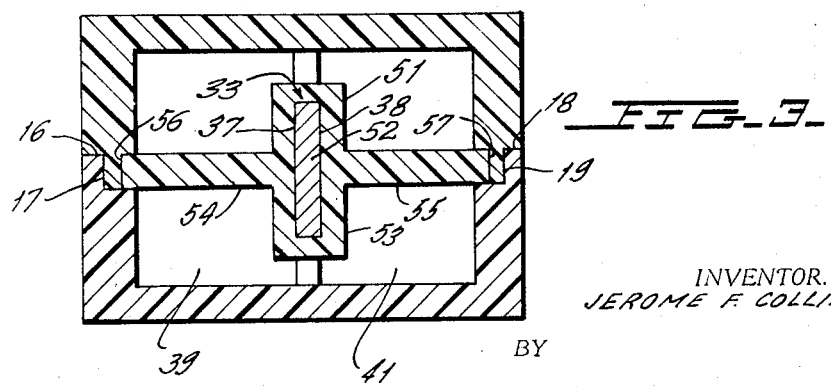
INVENTOR.
JEROME F. COLLINS
BY
OSTROLENK, FABER, GERB & SOFFEN
ATTORNEYS

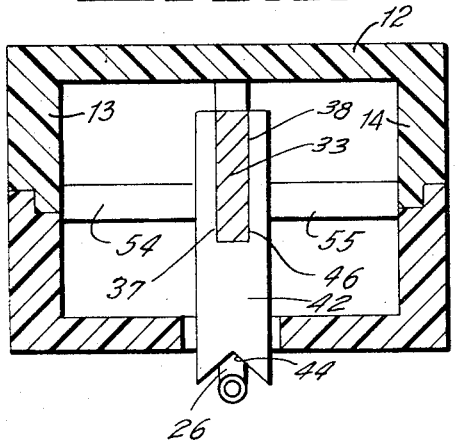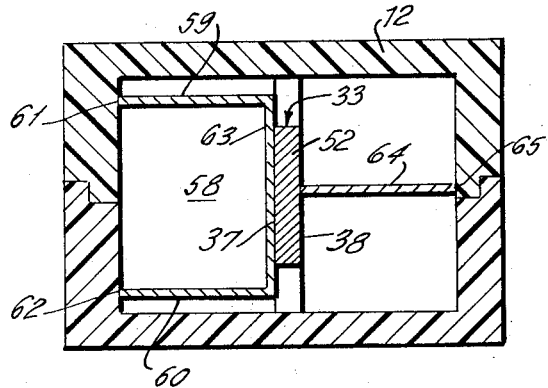

United States Patent Office 3,439,921
Patented Apr. 22, 1969

3,439,921
PHONOGRAPH PICKUP
Jerome F. Collins, Westbury, N.Y., assignor to Sonotone Corporation, Elmsford, N.Y., a corporation of New York
Filed Aug. 25, 1965, Ser. No. 482,364
Int. Cl. G11b 3/02
U.S. Cl. 274—37                                    10 Claims

ABSTRACT OF THE DISCLOSURE

In phonograph pickups, both of the monophonic and stereophonic type, which operate with flat elongated mechanoelectric transducer beam or beams for generating signals by stylus-imparted vibratory motion in a direction perpendicular to the beam plane, a central or intermediate portion of the transducer beams which is only a small fraction of its length is engaged along its opposite beam plane surfaces by rigid vibration suppressing structure which suppresses lateral vibration thereof in a direction transverse or lateral to its beam plane but permit vibrations of the transducer portion in a direction parallel to its beam plane. The rear end of the transducer may be restrained against lateral vibrations by elastomer body elements as conventional. This rigid lateral beam-plane support of the central or intermediate portion of the transducer beam is effective in suppressing spurious output of the transducer beams caused by the elastomer damping bodies held clamped to an intermediate length portion of the transducer beam, and also increases the desired signal output thereof.

This invention relates to phonograph pickups and more particularly to such pickups operating with flat mechanoelectric beamshaped transducers.

In the widely used phono-pickups or cartridges of this type, the stylus transmits the record-groove undulations to the front end of the transducer beam for imparting thereto vibrations in a direction perpendicular to its transducer beam plane and cause it to deliver a corresponding electrical signal output. The rear end of the transducer beam is usually restrained against lateral vibrations by embracing elastomer body portions clamped thereto by the associated housing or mounting structure. When excited by stylus vibrations at its resonant frequency, such transducer beam vibrates with a maximum amplitude at its center, with the vibration amplitude decreasing toward zero at its opposite ends, which vibrations are known as "free-beam mode" vibrations.

To suppress excessive resonant-peak vibration amplitudes and corresponding output distortion when excited by stylus vibrations near the resonant-frequency of a so mounted transducer beam, its central or intermediate beam portion has clamped thereto an elastomer clamping body, as described, for example, in U.S. Patent Nos. 3,087,027 (Dieter et al.) 2,848,559 (Palo) and 2,668,196 (Bauer). Although such lateral elastomer vibration damping of the intermediate region of the transducer reduces its resonant-peak-amplitude distortion, it causes dissipation of significant vibrational energy output at other parts of the audio-frequency range, and also introduces spurious outputs.

Among the objects of the invention are phonograph pickups or cartridges operating with one or more flat elongated mechanoelectric transducer beams which increase its output in response to stylus-vibrations imparted in a direction perpendicular or transverse to the transducer beam plane; and such pickup transducer combination in which the central or intermediate region of the transducer beam is not subjected to material strains by stylus vibrations imparted in the direction parallel to its beam plane.

In accordance with the invention, the mechanoelectric transducer beam of a phono-pickup having its front end driven by the stylus vibrations and the rear end restrained against lateral vibration for supplying output signals in response to vibrations in a direction transverse to its beam plane, has the opposite lateral beam surfaces of short central or intermediate portions thereof restrained against lateral vibrations or motion by relatively rigid opposite lateral bearing support causing suppression of the lateral planar motion of this intermediate beam portion—while enabling the so laterally-fixed intermediate beam portion to yield and move in the direction of the beam plane under stylus imparted motion components.

The foregoing and other objects of this invention will be best understood from the following description of embodiments thereof, by reference to annexed drawings wherein:

FIGURE 1 is a central cross-sectional view of one form of phonograph pickups of the invention, along line 1—1 of FIGURE 2;

FIGURE 2 is a bottom view of the same pickup;

FIGURES 3 and 4 are cross-sectional views of the same pickups along lines 3—3 and 4—4 of FIGURE 2; and FIGURE 5 is a cross-sectional view taken along a line corresponding to the line 3—3 of FIGURE 2, of modified form of the pickup exemplifying the invention.

Although the invention is of importance both in stereophonic phonograph pickups, such as described in U.S. Patent No. 2,236,956 and monophonic pickups, such as described in U.S. Patent No. 3,087,027, it will be herein described in connection with a monophonic pickup operating with a known type of flat mechanoelectric transducer beams which supplies a signal output only in response to lateral vibrations perpendicular or transverse to its beam plane, such as described, for instance, in U.S. Patent No. 2,769,867. However, other analogous known flat mechanoelectric transducer beams may be used in such phonograph pickups of the invention.

Referring to FIGURES 1 to 4, the monophonic pickup 11 is carried at the front end of a conventional tone arm (not shown) for playing back recorded lateral record-groove undulations of known type of record 32. However, the pickup 11 will also play back groove undulations of a standard 45—45 stereophonic record from the 45° inclined opposite faces thereof.

The pickup 11 includes an elongated housing or mounting structure 12 consisting of two molded insulating housing walls 13, 14.

The specific pickup 11 will play back laterally undulating record groove undulations either with a fine stylus 24 or with a thicker stylus 23. The styli 23, 24 are secured at the front end of a thin stylus rod 26 which is held in a seating member 28, as described, for instance, in U.S. Patent No. 3,236,956 (Kantrowitz). Seating member 28 is rotatively seated within a recess in the bottom housing section and retained as by an elongated spring member 29 which is affixed to the housing by the rivet 22.

An elongated flat mechanoelectric transducer beam 33 is mounted within housing structure 12. Transducer beam 33 is provided with a support end 34 and a "free" or stylus driven end 36. Illustratively, transducer 33 may be a ceramic piezoelectric bilaminate which delivers an electric signal output in response to vibrations perpendicular or transverse to its main beam plane which extends in FIGURE 1 parallel to the plane of the drawing sheet. However, such transducer beam may also be mounted with its plane extending obliquely or 45° to a vertical plane, as in a stereophonic pickup of said Patent 3,236,956. Opposite electrode surfaces 37, 38 deliver an electrical signal output corresponding to lateral vibrations of transducer beam 33.

The housing structure 12 holds elastomer pads or bodies 39, 41 in operative position against the major lateral surfaces of the rear end 34 of the transducer beam 33 for restraining vibrations thereof. The transducer beam 33 has thus a longitudinal axis extending between rear end 34 and its front end 36.

The free excitation of front end 36 of the transducer beam 33 is vibrationally coupled, with a plastic coupler 42, to the stylus rod 26 for transmitting the stylus vibrations to the transducer beam 33. As shown in FIGURE 4, one end of coupler 42 includes a stylus coupling portion 44 engaged by stylus rod 26. The other end of coupler 42 includes a recessed rectangular slot 46 dimensioned to snugly hold the free front end 36 of transducer beam 33. The free transducer end 36 may be affixed as by friction or cement to the coupler recess 46. The coupler transmits the lateral groove undulations imparted by the stylus rod 26 to the free or front end 36 of transducer beam 33. The corresponding signal output of transducer beam 33 is delivered to output terminals 47, 48 held clamped to the transducer-electrode surfaces 37, 38 (FIGS. 1, 2).

In accordance with the invention, a rigid intermediate or bearing support member or column 51 which is very short or thin in the longitudinal or axial length of the transducer beam engages the opposite lateral beam surfaces 37, 38 disposed at transducer point 52 intermediate the ends 34, 36 of transducer 33. Rigid support column member 51 has a central frame portion 53 dimensioned to snugly receive and embrace a short length 52 of the transducer 33. Rigid support member has an aligned pair of laterally extending column legs 54, 55 extending from the central frame portion 53 and respectively affixed in recessed portions 56, 57 on opposite walls of the mounting structure 12. Column member 51 may be formed of plastic material and is oriented to provide rigid lateral support for the intermediate portion of transducer 33 against motion in the lateral direction. The column member 51 being thin or short in the longitudinal axial direction of transducer beam 33, is simultaneously adapted for flexural movement in the vertical direction and parallel to the plane of the transducer beam.

Because of its intermeditae rigid support 51, the stylus driven end 36 of transducer 33 is restrained against lateral vibration of the transducer beam by rigid intermediate support columns 51 and 52 and by elastomer bodies at its rear end 34.

The axial spacing between the elastomer pads 39, 41 and the column member 51 may be adjusted to suit the requirements of voltage sensitivity and compliance in any particular case. The axially-short intermediate rigid column member 51, in conjunction with the axially limited elastomer pads 39, 41, form a rigid, and compliant multiple support, respectively, restraining lateral movements of the transducer 33, thereby improving the lateral transducing efficiency of the pickup 11.

In operation, vibrations imparted to the engaged stylus 24 in directions perpendicular to the angularly related groove faces are transmitted to the free end 36 of transducer beams 33 by coupler 42. Because of the rigid column support 51 of the intermediate transducer beam portion 52, the horizontal components of their respective vibrations are efficiently transduced by the laterally pin-supported transducer 33 into electrical signals appearing at electrode surfaces 37, 38. The vertical components of the respective vibrations are prevented from entering the external playback system (not shown) through the terminal strips 47, 48 by the flexural movement of the rigid support column member 51 in the direction of the beam plane in response to such components. As indicated before, the column member 51 has sufficient lateral stiffness for transmitting to the transducer 33 the lateral components of vibration exerted on the engaged stylus 24 by the groove 32. The normal tracking force of the stylus 24, in the record groove 32 (about 5–6 grams), is prevented from being increased by the vertical flexure of the column member 51, thereby avoiding damage to both the record groove and the stylus as a result of the vertical vibratory components of the groove.

The presence of the rigid lateral support 51 for the short intermediate transducer beam portion 52 reduces spurious movement which might otherwise arise because of the flexibility of compliant supports 39, 41.

The presence of the rigid intermediate transducer support 51 also reduces the effect of an objectionable spurious mode of transducer vibrations as a beam simply supported at both ends vibrating with a free beam mode. The normal axial distribution of vibrational displacement along the transducer 33, when vibrating with a free beam mode decreases from a maximum at the center of the transducer beam to essentially zero at each transducer end 34, 36. The short rigid lateral beam support 51 intermediate transducer beam ends 34, 36 provides a corresponding intermediate point of zero displacement and results in a shift of the resonance of the undesired mode to a frequency outside of the desired audio spectrum of the pickup 11. Moreover, as indicated before, the presence of the rigid lateral support 51 intermediate the transducer beam ends 34, 36 provides greater voltage sensitivity and compliance than the arrangements of the prior art, which are essentially cantilevered with respect to lateral vibrations.

An alternate form of such intermediate stiff lateral support for the transducer beam 33 is shown in FIGURE 5. The intermediate support comprises an axially or short U-shaped frame 58 having laterally disposed legs 59, 60 extending normal to transducer beam 33 and affixed to spaced portions 61, 62 of a facing side wall 13 of the mounting structure 12. The support frame 56 includes a crosspiece 63 interconnecting the legs 59, 60 and disposed parallel to electrode surface 37 of the transducer beam 33. The electrode surface 37 is affixed as by cement to the crosspiece 63. An opposite leading leg 64 extends from the opposite transducer electrode surface 38 of the transducer beam to the facing wall portion 65 on the mounting structure 12. The required lateral stiffness which supplies transverse motion of the intermediate transducer beam portion is provided by the lateral loading of the legs 59, 60 and opposite leg 64 while the side sway of these legs 59, 60, 64, 58 provides the required vertical flexibility to adapt such transversely vibrating transducer beam 33 for use with monophonic stereophonic records.

The invention has been particularly described with respect to a pickup cartridge adapted to play back lateral undulations of a record groove with increased efficiency. However, the invention is applicable to cartridges adapted to play back records with vertical undulations with increased efficiency by providing an analogous support having maximum vertical stiffness at an intermediate point of the transducer beam. Moreover, the invention may be utilized to play back two angularly related undulation sequences recorded on transverse surface portions of a single stereophonic record groove without damaging it.

The embodiments of the invention in which an exclusive privilege or property is claimed are described as follows:

1. In a phonograph pickup cartridge:
   a flat elongated mechano-electric transducer beam responsive to transverse mechanical vibrations in a direction transverse to the major plane of said beam for supplying corresponding signals over a predetermined wide audio frequency range;
   a mounting structure having opposite inward wall faces and restraining body elements held clamped by said inward wall faces against the outward lateral faces of the rearward end of said transducer beam for restraining transverse vibrations thereof and maintaining transverse vibration at the other end of said transducer beam;
   a stylus carried by said mounting structure and being engageable with and vibrated by undulations of said record groove;
   a vibratory coupling connection between said stylus and said other beam end imparting to said beam said transverse vibrations; and rigid lateral support elements engaging and laterally interposed between said opposite inward wall faces and the outward lateral faces of an axially short intermediate beam length between the opposite ends of said transducer beam causing suppression to substantially zero amplitude of said transverse vibrations of said short intermediate beam length held between said rigid support elements.

2. In a phonograph pickup cartridge according to claim 1:

said lateral support elements being relatively compliant in a transverse direction perpendicular to said direction transverse to the major plane of said beam.

3. In a cartridge as claimed in claim 1:

said rigid lateral beam support elements being compliant in a direction parallel to said beam plane and causing said engaged short intermediate beam length to yield in said plane-parallel direction.

4. In a cartridge as claimed in claim 3:

said rigid lateral beam elements constituting parts of an elongated column extending transversely to said beam plane.

5. In a pickup cartridge for playing back a record groove having two angularly disposed groove faces capable of imparting vibrations in different directions:

a housing having a compartment with opposite inward wall faces;

a stylus carried by said housing and adapted to ride in said groove and being vibrated in said different directions;

a flat elongated piezoelectric transducer beam carried in said compartment responsive to vibrations in a direction transverse to the major plane of said beam for supplying corresponding signals over a predetermined wide audio-frequency range;

a coupler connection for imparting the vibrations of said stylus to one end of said transducer beam;

restraining elements held clamped by said inward wall faces and the opposite rearward end faces of said transducer beam for restraining transverse vibrations of said rearward beam end;

rigid lateral support elements engaging and rigidly supporting an intermediate short length of said transducer beam between said inward housing wall faces causing suppression to substantially zero amplitude of lateral vibrations of said short beam length held between said rigid support elements in the direction transverse to said beam plane;

said rigid lateral support elements yieldably supporting said short intermediate beam length for vibration in a direction parallel to said beam plane under forces imparted by said stylus.

6. In a cartridge according to claim 5:

said lateral support elements comprising a transverse column member aligned in a direction parallel to said direction transverse to the major plane of said beam;

said column member having a central portion for receiving said transducer;

the opposite ends of said column member being respectively affixed to adjacent portions of said housing.

7. In a cartridge as claimed in claim 5:

said rigid lateral beam support elements being parts of of an elongated column extending transversely to said beam plane;

said column being rigid in the direction of its length and yieldable in the direction transverse to the column length.

8. In a cartridge according to claim 5:

said lateral support elements comprising a U-shaped frame having a pair of parallel legs extending transversely to said beam plane;

the free ends of said legs affixed to said housing;

said transducer affixed to portions of said frame interconnecting said legs.

9. In a cartridge according to claim 5:

said different directions of said record groove being respectively disposed at 45° to the record surface.

10. In a cartridge according to claim 9:

said transverse direction being perpendicular said beam plane.

References Cited

UNITED STATES PATENTS

| 3,327,069 | 6/1967 | White | 179—100.41 |
| 3,183,311 | 5/1965 | McAlvay | 179—100.41 |
| 2,848,559 | 8/1958 | Palo | 179—100.41 |

FOREIGN PATENTS

| 909,598 | 11/1962 | Great Britain. |
| 1,218,480 | 5/1960 | France. |

LEONARD FORMAN, *Primary Examiner.*

F. J. D'AMBROSIO, *Assistant Examiner.*